United States Patent [19]
Mendelevsky et al.

[11] 3,899,222
[45] Aug. 12, 1975

[54] HYDROSTATIC BEARING

[76] Inventors: Yakov Idelevich Mendelevsky,
prospekt Lenina, 39/1, kv. 9,
Vilnjus; Mikhail Efimovich Vaistub,
ulitsa Krasny Kazanets, 7, kv. 83,
Moscow; Vilis Yanovich Eglitis,
ulitsa Vilnyaus, 18, kv. 40, Vilnjus,
Salininkai, all of U.S.S.R.

[22] Filed: May 18, 1973

[21] Appl. No.: 361,848

[30] Foreign Application Priority Data
June 2, 1971 U.S.S.R. .......................... 1672656
June 6, 1972 U.S.S.R. .......................... 1788751

[52] U.S. Cl. ...................... 308/5 R; 308/9; 308/122
[51] Int. Cl. .......................................... F16c 17/00
[58] Field of Search .................... 308/5, 9, 122, 3 A

[56] References Cited
UNITED STATES PATENTS
| | | | |
|---|---|---|---|
| 3,067,979 | 12/1962 | Cox...................................... | 308/5 R |
| 3,658,393 | 4/1972 | Luthi.................................... | 308/5 R |
| 3,747,639 | 7/1973 | Eickmann............................. | 308/9 |
| 3,754,799 | 8/1973 | Hedberg............................... | 308/5 R |

FOREIGN PATENTS OR APPLICATIONS
1,178,763   2/1966   United Kingdom..................... 308/9

*Primary Examiner*—Charles J. Myhre
*Assistant Examiner*—R. H. Lazarus
*Attorney, Agent, or Firm*—Holman & Stern

[57] ABSTRACT

In order to create a hydrocushion between the female and male parts of the bearing by means of forcing a liquid layer medium between said parts, one of the parts having recesses forming, together with the surface of another part, chambers, some of the chambers comprising the receiving chambers communicating with a source of a liquid medium under pressure, the other chambers being the bearing ones designed to create said hydrocushion the chambers communicating with each other through channels so that each of the channels connects the receiving and the bearing chambers accomodated on opposite sides relative to the longitudinal axis of a part each channel has a helical or screw-type portion arranged in said part between the bearing chambers and comprises an insert wherein the screw-type portions of all the channels are provided.

Such a hydrostatic bearing being most effective when used in spindle units of diamond-boring machines.

7 Claims, 11 Drawing Figures

HYDROSTATIC BEARING

FIELD OF THE INVENTION

The present invention relates to a fluid bearing for machine parts and more particularly to a hydrostatic bearing for machine parts.

The invention is most effective when used in spindle units of metal-cutting machines and in diamond-boring machines, in particular.

DESCRIPTION OF THE PRIOR ART

A hydrostatic bearing for machine parts is known in the art and is in the form of a layer of a liquid medium forced in between the female and male parts in order to create a hydrocushion therein. Provided in one of the parts are recesses that form, together with the surface of another part, chambers some of which are the receiving ones communicating, through slit throttles, with a liquid medium under a pressure source and the other chambers are the bearing ones creating said hydrocushion and communicating through channels so that each of the channels connects the receiving and the bearing chambers arranged on opposite sides from the longitudinal axis of the male part.

Thus, for instance, there is a hydrostatic bearing for a valve shaft rod, made as a layer of a liquid medium (oil) forced between the female part, i.e., the housing of the valve shaft, and the male part, i.e., the valve shaft rod, in order to create a hydrocushion therein. Besides, there are recesses on the valve shaft that form, together with the housing surface, chambers some of which are the receiving ones communicating, via slit throttles, with a source of oil under pressure and the other are the bearing ones creating said hydrocushion. the chambers communicate through channels so that each of the latter connect the receiving and the bearing chambers arranged on opposite sides of the longitudinal axis of the rod (Cf. the U.S. Pat. No. 2,459,825).

In such a known bearing, the (communication) channels that connect the respective receiving chambers with the bearings ones are made rectangular.

It is commonly known that in order to impart supporting power to the bearing, the channels should not cross. In the known bearing, to comply with this condition, the rectangular channels are arranged at a certain angle to the longitudinal axis (of the male part) of the bearing, with a simultaneous shift in their relation to it, with the angle of the slope and the shift value relative to said axis depending on the size of the diameter of the mating (female and male) parts, the cross-section of the channels and the number of the bearing chambers.

Thus, a bearing with a selected diameter for its mating parts and the size of the cross-section of the channels can be arranged only with a certain maximum number of bearing chambers, as any increase in this number would make the condition of the non-crossing of the above communication channels unfeasible.

As a result, the number of the bearing chambers in the known hydrostatic bearing cannot be increased at a given diameter for the mating parts, and, consequently, the supporting power of the bearing is limited.

A decrease in the cross-section of the communication channels can, in some instances, provide a minor increase in the number of bearing chambers; however, such a reduced cross-section in the communication channels increases their hydraulic resistance to the flow of a liquid medium, which results in reducing the supporting power of the bearing.

On the other side, the known bearing with a preset number of bearing chambers at a preset cross-section of the communication channels is feasible only at a certain diameter of the mating parts because the condition of the non-crossing of the communication channels in the central zone of the bearing cannot otherwise be complied with. This is the reason why the known bearing cannot have a small radial size.

The necessity of the provision for channels in the known bearings, shifted in relation to the longitudinal axis of the bearing, precludes the feed of a liquid medium from the channels toward the center of the bearing chambers, which is known to affect the anisotropic function and the supporting power of the bearing (cf. "Friction Characteristics of Liquid Hydrostatic Journal Bearings" by J. N. Shinkle and K. G. Hornung)

Thus, due to the above-described embodiment of the communication channels, the known hydrostatic bearings feature inadequate supporting power and an anisotropic function as well as having radial sizes which are too big, which reduces the sphere of their application.

In the known hydrostatic bearings, the receiving and the bearing chambers are arranged in sequence and are formed by the same surfaces of the female and male parts of the bearing.

Once a load is applied to the bearing, the response of the liquid medium pressure develops in the chambers forthwith. In the bearing chambers, the direction of this response is opposite to the vector of the load, while in the receiving chambers it coincides with the direction of this vector. As a result of such distribution of the liquid medium pressures in the chambers, the supporting power appears to be decreased by a value equivalent to the receiving chambers area.

Therefore, in order to create a hydrostatic bearing having a preset supporting power, it is necessary to increase the area of the bearing chambers by the size of the area of the receiving chambers, which conditions the axial sizes of the bearing.

A successive arrangement for the bearing the receiving chambers with their slit throttles along the (longitudinal) axis of the male part prompts their limitation by separating the throttle slits, which provides another increase in the axial sizes of the bearing by the size of these slits. Moreover, such an arrangement for the bearing chamber and the receiving chambers of the bearing results in an axial overflow of the liquid medium between the adjoining chambers through a separating throttle slit, said axial flowover causing, at the moment of load application, a reduction in the pressure difference between the loaded and the unloaded bearing chambers, which also reduces the supporting power of the bearing.

In cases where the bearing parts have a mutual relative motion (rotary or progressive, or both), the above-described arrangement for the receiving chambers with their slit throttling results in a marked increase in the bearing's heat liberation due to an increased oil friction area against the moving surfaces of the parts within the zone of the receiving chambers, their slit throttles in the zone of a separating throttle slit between the receiving and bearing chambers, as well as due to the necessity of expanding the area of the bearing chambers by the size of the receiving chambers.

Thus, the known hydrostatic bearings suffer, due to the abovedescribed embodiment of the communication channels and the arrangement for the receiving chambers with their slit throttles, from an inadequately high supporting power with considerable heat liberation and big axial sizes, which appreciably restricts the sphere of their application in spindle units, especially when the speeds of mutual displacement of the surfaces of the bearing's parts are high, specifically, in spindle units of precision metal-cutting machines.

It is commonly known that the supporting power of the hydrostatic bearing depends on the pressure difference of the liquid medium between the loaded and unloaded chambers. Yet, as the chambers are radially separated from each other by means of slit throttles, the radial overflow of the liquid medium between the adjoining chambers occurs, that reduces this said pressure difference and, consequently, the supporting power of the hydrostatic bearing.

In the course of the motion of the male part relative to the female one, vibration emerge that affect the accurate travel of the bearing parts.

In order to reduce above vibrations in the bearing, use is made of various devices, e.g., dampers, which results in a further increase in the bearing sizes.

In the known hydrostatic bearings, the rectangular channels connecting the receiving chambers with the respective bearing chambers pass close to the central portion of the male part of a bearing. In view of this, in such known hydrostatic bearings, it is impossible to provide for central boring in the bearing's male part sufficient to permit various control rods through said bearing to feed a cooling liquid and permit other operations. This substantially limits the sphere of application of the known hydrostatic bearings.

Thus, the above disadvantages in the known bearings substantially restrict the sphere of their application, specifically in spindle units of precision metal-cutting machines where a large supporting power for the bearing are required rather then a high accuracy motion of the bearing parts and limited heat liberation during this motion.

SUMMARY OF THE INVENTION

An object of the present invention is to eliminate the above-mentioned disadvantages.

The primary object of the invention is to create a hydrostatic bearing for machine parts with an embodiment for the channels communicating the receiving chambers with the bearing chambers that correspond to them that would ensure higher supporting power for the bearing and its asinotropic functional ability with a simultaneous reduction in the radial and axial sizes of the hydrostatic bearings, as compared with the known hydrostatic bearings of the same type.

This object is accomplished by creating such a hydrostatic bearing for machine parts, wherein, according to the invention, each channel connecting a receiving chamber and its related bearing chambers has a screw-type portion, with an insert being placed between the bearing chambers, and wherein said screw-type portions of all the channels are accomodated.

Owing to such design embodiment of the bearing, the channels effect the connection of the receiving and bearing chambers with their geometrical centers being the zones of equal pressures of the liquid medium. When the screw-type portions the channels 'go around' the central zone of the bearing, an improved anisotropic function of the bearing chambers results; as for the supporting power of said bearing, it can be increased by increasing the number of pairs of receiving chambers and bearing chambers, with the parameter of mating of the bearing parts and the cross-sections of the channels being invariable.

It is advantageous for the functioning of the proposed hydrostatic bearing that the insert with the screw-type portions of all the channels be arranged in the male part of the bearing with a gap sufficient for a radial shift of the insert relative to the longitudinal axis of this part, and if it functions as the male part relative to it, the receiving chambers being formed by the recesses provided on the insert and by the surface of the male part that faces said recesses whereas the slit throttles of these chambers will be formed by the surfaces of the insert and the male part that face each other.

Owing to such design embodiment, the receiving chambers with their slit throttles are arranged inside the male part of the bearing and are formed by the forces devoid of relative motion, while there is such a motion between the female and male parts of the bearing, which as a result, the supporting power of the bearing tends to rise, whereas the heat liberation therein decreases while its axial sizes are reduced.

It is not less favourable to arrange, in the gap between the male part and the insert with its screw-type portions, a band made of a rubber-like material and having ports coinciding with the receiving chambers and their slit throttles, as well as ports in places where the channels meet their screw-type portions.

Owing to such a band, the throttle slits separating the receiving chambers radially are filled with a material of said bond that precludes the possibility of radial flowover of the liquid medium between the adjoining chambers and the cushions of the insert's motion relative to the male part, the result of which the supporting and the damping power of the bearing increases.

It is expedient that the insert with its screw-type portions in all the channels be made of a material whose specific weight is well above the specific weight of a material of the male part of the bearing, while the mass of said insert should be selected so as to be a damper for the vibrations emerging in the course of the male part's travel relative to the female one.

Owing to such embodiment, said insert with the screw-type portions in the channels is at the same time a damper for the vibrations developing during the course of the motion of the male part in the bearing, which helps to increase the vibration resistance of said bearing.

It is highly desirable to make the insert with the screw-type portions in all the channels as a bush to be arranged coaxially with the male part in its central boring.

Owing to such embodiment of the insert, it is possible to make use of the central boring of the male part for the passage of, e.g., the rods of clamping devices.

It is recommended that said insert be made of a material whose elastic modulus is substantially smaller than that of a material of the male part.

When making the insert of such materials, deformations or distortions in the initial accuracy, especially, in thin-walled (some 5 mm thick) male parts of the bearing are precluded during the assemblywork, the result of which ensures a high accuracy of the functioning of the hydrostatic bearing.

The screw-type portions of the channels can be formed by grooves screwed on the outer surface of the insert and by the surface of the male part of the bearing that overlooks them.

Such an embodiment for the screw-type portions of the channels on the insert permits to work the surfaces that form them to be worked with a high accuracy on multi-purpose metal-cutting machines by the known technique, the result of which the operation of producing the bearings becomes simpler, whereas the temperature characteristics of a bearing remain unchanged.

Thus, the proposed hydrostatic bearing features a higher supporting power and a higher accuracy of functioning with reduced heat liberation, as compared with the known hydrostatic bearings of a similar type and sizes.

The invention will become more apparent from the following description of its exemplary embodiments, reference being made to the appended drawings, wherein:

DESCRIPTION OF THE PREFERRED EMBODIMENTS

Proposed is a hydrostatic bearing for machine parts wherein a layer A (FIG. 1) of a liquid medium is forced in between a female 1 and male 2 parts for creating a hydrocushion therein. One of the parts has recesses forming, together with the surface of another part, chambers. Some of sid chambers are the receiving chambers 3 communicating, via slit throttles 4, with a source B of the liquid medium under pressure, while the others are the bearing chambers 5 designed to create said hydrocushion. The receiving 3 and the bearing 5 chambers are connected by channels 6 so that each of the channels connects a receiving and a bearing chamber arranged on opposite sides relative to the geometrical longitudinal axis 7 of the male part 2.

Figure 1:
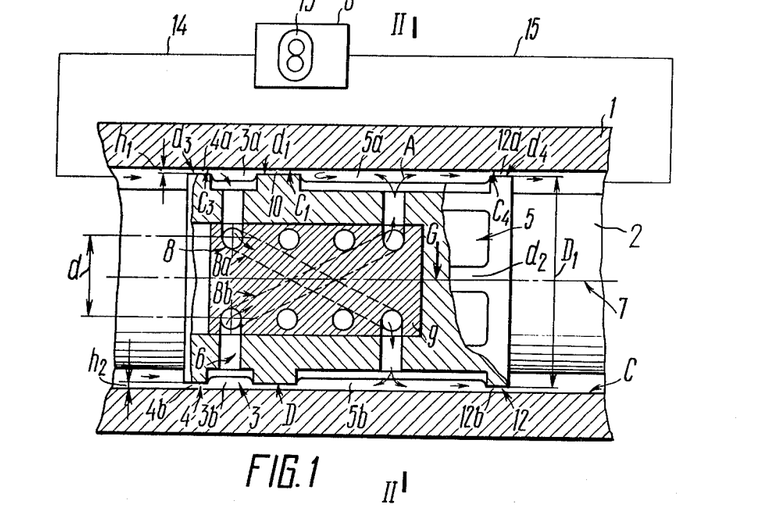
FIG. 1 shows schematically a hydrostatic bearing for machine parts, according to the invention (longitudinal section)

According to the invention, each channel 6 has a screw-type portion 8, an insert 9 being provided in the male part 2 between the bearing chambers 5a and 5b, said insert accomodating all screw-type or helical portions 8 of all the channels 6.

In the exemplary embodiment under consideration, the female part 1 is made as a bearing casing whose bore accomodates, with a gap, the male part 2, i.e., a shaft. Recesses for the formation of the receiving 3 and the bearing 5 chambers are made on said shaft 2, while the receiving chambers 3 and the bearing chambers 5 proper are formed by said recesses and by the surface C of the hole in the casing 1.

Figure 2:
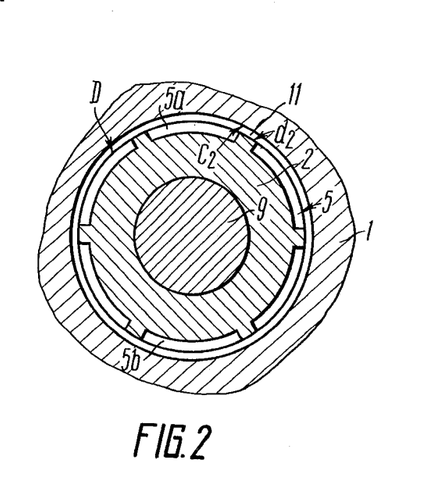
FIG. 2 shows a section II—II as in FIG. 1.

The bearing has six receiving chambers 3 and, accordingly, six bearing 5 (FIG. 2) chambers separated one from another axially by means of throttle slits 10 (FIG. 1) formed by portions $d_1$ of the surface D and portions $c_1$ of the surface C, while tangentially - by means of tangential throttle slits 11 (FIG. 2) formed by portions $d_2$ of the surface D and portions $c_2$ of the surface C.

The slit throttles 4 (FIG. 1) of the receiving chambers 3 are formed by portions $d_3$ of the surface D of the shaft 2 and portions $c_3$ of the surface C of the hole in the casing 1.

The bearing chambers 5 have outlet slit throttles 12 formed by portions $d_4$ of the surface D of the shaft 2 and portions $c_4$ of the surface C of the hole in the casing 1.

Figure 3:
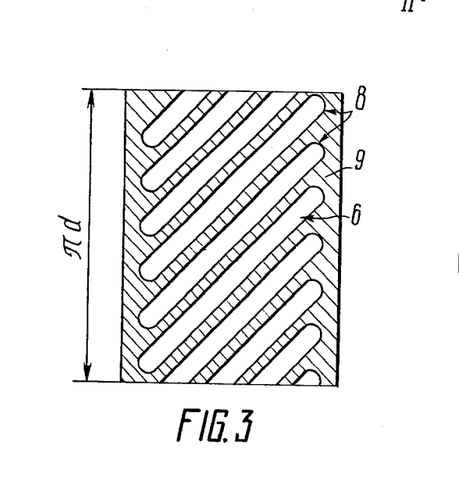
FIG. 3 shows a development of the surface of the insert 9 along diameter d (FIG. 1)

Provided between the bearing chambers 5a and 5b in the male part 2 is, according to the invention, an insert 9 fashioned (in the exemplary embodiment being considered) as a cylindrical part whose body has screw-type portions 8 of all the channels 6. FIG. 3 shows the development along diameter $d$ of the insert 9 with the screw-type or helical portions 8 of all the channels 6.

Oil is used as liquid medium.

The hydrostatic bearing functions in the following way.

Oil from source B (FIG. 1) of the liquid medium under pressure is fed by a hydraulic pump 13 into all the receiving chambers 3 at one time along a main duct 14 through the slit throttles 4. Thereafter, the oil goes to the respective chambers 5 along the channels 6 through their screw-type portions 8 to be drained therefrom into the source B along a drain duct 15 through the outlet slit throttles 12.

Initially, prior to oil supply, the shaft 2 lies on the surface C of the hole in the casing 1. The height $h_i$ of the throttle slits 4a and 12a is equal to $h_1 = H$ (i.e., it is equal to a resultant gap), while the height $h_2$ of the slit throttles 4b and 12b is equal to zero: $h_2 = O$. As the hydraulic friction of the throttle slit 4a is far smaller than that of the throttle slit and the flow rate through the slit 4a will be far higher than that through the slit 4b. Due to which, a greater amount of oil will be fed to the receiving chamber 3a and, accordingly, to the bearing chamber 5b than to the chambers 3b and 5a. The resistance to oil drainage from the chamber 5b through the outlet throttle 12b is far higher than that through the outlet throttle 12a from the chamber 5a. Because of such ratio of hydraulic resistances of the throttle slits, the oil pressure in the bearing chamber 5b rises rapidly, and the shaft 2, under the action of a force conditioned by a pressure difference between the chambers 5a and 5b, floats up in the hole in the casing 1 in order to occupy a position at which the difference of the oil pressures in the chambers 5a and 5b counterbalances the weight of the shaft 2.

Once a load is applied to the shaft 2, e.g., in the direction of G, said shaft 2 will move downward under the action of this load, and the height $h_1$ of the slit throttle 4a of the receiving chamber 3a as well as the height $h_1$ of the slit outlet throttle 12a of the bearing chamber 5a will increase; the height $h_2$ of the throttle 4b of the chamber $3_b$ and the height $h_2$ of the throttle 12b of the chamber 5b will decrease. As this takes place, their hydraulic resistances will drop accordingly for the throttles 4a and 12a and will rise for the throttles 4b and 12b, as a result of which the flow rate through the throttle 4a into the chambers 3a and 5b will rise, while the flow rate through the throttles 4b into the chambers 3b and 5a will drop. The pressure in the chamber 5b will increase due to the increased flow rate and that in the chamber 5a will decrease due to the decreased flow rate. Besides, an increase in the resistance of the outlet throttle 12b will result in an increase in the pressure in the chamber 5b as well, and the reduced resistance of the outlet throttle 12a will bring about the reduced pressure in the chamber 5a. The difference between the pressures in the chambers 5b and 5a will condition the value of the restoring force (i.e., the supporting power of the bearing) that accepts the load applied to the shaft 2.

It is commonly known that in order to ensure the anisotropic function of the hydrostatic bearing as well as to raise the supporting power of the latter, it is practical that the forced feeding of the liquid medium be effected into the (geometrical) center of the bearing chambers. The embodiment of the channels 6 with the screw-type portions 8 arranged in the insert 9 permits the connection of the geometrical centers of the receiving chambers 3 and the bearing chambers 5, which are the areas of equal pressures. The helical or screw-type portions 8 of the channels 6 circumvent as it were the central zone of the shaft 2, which helps increase the number of channels without their crossing, and, consequently, the supporting power of the bearing can be increased by increasing the number of pairs of the receiving chambers 3 and the bearing 5 chambers, the perimeter $D_1$ of the bearing shaft 2 and the cross-section of the channels 6 remaining unchanged.

The hydrostatic bearing made according to the invention, can be most effective when used in spindle units of precision metal-cutting machines, e.g., diamond-boring ones, that will ensure parts finishing with a high shape accuracy (non-roundness of some 0.0002 – 0.0005 mm) and a high surface finish at high cutting speeds ( V > 400 m/min for non-ferrous metals).

In addition to the above-mentioned advantages of the hydrostatic bearing, the embodiment of the channels 6 with the screw-type portions 8 in the insert 9 provided between the bearing chambers 5 permits other exemplary embodiments designs for the hydrostatic bearing, that feature other advantages from the point of view of their operating qualities, as compared with the known hydrostatic bearings of a similar type.

Figures 4, 5, 6:
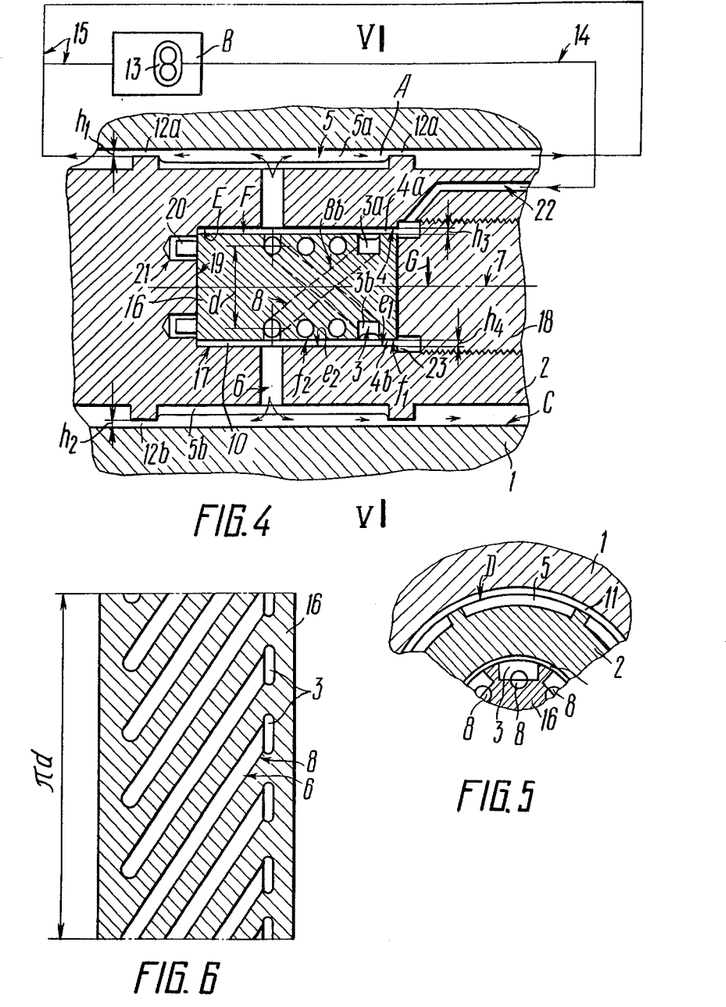
FIG. 4 shows another exemplary embodiment of a hydrostatic bearing, according to the invention (longitudinal section)
FIG. 5 shows a partial cross-section V—V as in FIG. 4.
FIG. 6 shows a development of the surface of an insert 16 along diameter d (FIG. 4)

FIG. 4 shows a hydrostatic bearing made according to the invention, wherein the insert 16 with the screw-type portions 8 of all the channels 6 is arranged in a bore 17 of the male part 2 with a gap sufficient for radial shifts of this insert relative to the geometrical longitudinal axis 7 of the part 2. Said insert 16 is a male part relative to the part 2. The receiving chambers 3, in this case, are formed by recesses made on the insert 16 and the surface E of the male part 2, that overlies them, while the slit throttles 4 of these chambers are formed by the surfaces F and E facing each other of the insert 16 and the male part 2, respectively. The slit throttles 4 of the receiving chambers 3 are formed by portions $f_1$ of the surface F of the insert 16 and portions $e_1$ of the surface E of the hole 17 of the part 2. The insert 16 with its screw-type portions 8 is secured against axial movement by means of a nut 18 and a butt end 19 of the bore 17 of the shaft 2 and turns against - by means of lugs 20 fitting into respective recesses 21 provided on the butt end 19 of the shaft 2. The bearing chambers 5 are formed similar to the bearing chambers according to the exemplary embodiment of the hydrostatic bearing shown in FIG. 1, but have two outlet slit throttles 12 formed by the surface C of the casing 1 and the surface D (FIG. 5) of the shaft 2. The screw-type portions 8 of all the channels 6 enter the respective receiving chambers 3, as shown on the development along the diameter d of the insert 16 (FIG. 6).

The main duct 14 (FIG. 4) that feeds the oil has a channel 22 connected with a groove 23 for the oil reception, made in the body of the shaft 2.

The hydrostatic bearing embodied according to the invention and shown in FIG. 4 functions as follows.

Oil is fed from the source B of the liquid medium under pressure by the hydraulic pump 13 into the groove 23 along the main duct 14 through the channel 22, wherefrom the oil goes to the receiving chambers 3 through the slit throttles 4. From said receiving chambers 3, the oil goes to the bearing chambers 5 along the channels 6 through the screwtype portions 8 of the insert 16; then, through the outlet slit throttles 12 and along the drain duct 15, the oil is drained into the source B of the liquid medium.

Initially, prior to feeding the oil to the bearing, the shaft 2 lies on the surface C of the hole provided in the casing 1, while the insert 16 is on the surface E of the bore 17 of said shaft 2. The height $h_3$ of the slit throttle 4a of the receiving chamber 3a is maximum, whereas the height $h_4$ of the slit throttle 4b of the receiving chamber 3b is minimum. At the same time, the height $h_1$ of the outlet slit throttle 12a of the chamber 5a is maximum and the height $h_2$ of the outlet slit throttle 12b of the bearing chamber 5b is minimum. Owing to such distribution of the heights of the slit throttles 4 and 12, the hydraulic resistances of the throttles 4a and 12a are minimum and the throttles 4b and 12b are maximum. The rate of flow of the oil through the throttles 4a and 12a is maximum, while that through the throttles 4b and 12b is minimum, i.e., the amount of the oil fed to the bearing chambers 5b will be maximum at a maximum resistance to its drainage and the amount of oil fed to the bearing chambers 5a will be minimum at a minimum resistance to its drainage. Consequently, the oil pressure in the chamber 5b will be far greater than that in the chamber 5a, and the difference between the pressures in the chambers 5a and 5b will condition the emergence of a force that elevates the shaft 2. The elevation of said shaft 2 is accompanied by the redistribution of the heights $h_1$ and $h_2$ of the outlet slit throttles 12a and 12b, their hydraulic resistances and rates of oil flow through these throttles from the bearing chambers 5, as a result of which the pressure in the chamber 5b begins to decrease and that in the chamber 5a begins to increase. The elevation of the shaft 2 and variations in the pressures in the chambers $5a$ and $5b$ will continue until the oil pressure in the chambers counterbalances the mass of the shaft 2. A rise in the pressure in the chamber $5a$ is accompanied by a respective rise in the pressure in the receiving chamber $3b$ coupled with the former by means of the channel 6, while a drop in the pressure in the chamber $5b$ will result in a corresponding drop in the pressure in the chamber $3a$. The difference between the pressures in the chambers $3a$ and $3b$ will cause the emergence of a force that moves the insert 16 relative to the axis 7 of the shaft 2; this shift continues until the force caused by the difference in the pressures in the receiving chambers $3a$ and $3b$ counterbalances the mass of the insert 16.

Once the load G is applied to the shaft 2 (conventionally, in the direction of G), said shaft 2 shifts downward and the height $h_2$ of the outlet throttle $12b$ of the chamber $5b$ decreases, its hydraulic resistance to the drainage of oil from the chamber increases and the height $h_1$ of the outlet throttle $12a$ of the chamber $5a$ rises and the hydraulic resistance to the drainage of oil from the chamber $5a$ tends to drop. The redistribution of the hydraulic resistances of the outlet throttles $12a$ and $12b$ will result in a rise in the pressure in the chamber $5b$ and a drop in the chamber $5a$, i.e., a pressure difference will arise between the bearing chambers $5a$ and $5b$, that creates a force opposing the load G. Accordingly, a change in the pressures in the receiving chambers 3 will occur. Thus, pressure will rise in the receiving chamber $3a$ communication with the bearing chamber $5b$ and it will drop in the chamber $3b$ communicating with the bearing chamber $5a$. As a result of the redistribution of pressures in the receiving chambers 3, the balanced position of the insert 16 will be upset, and the insert will start shifting downward. The height $h_3$ of the throttle $4a$ will rise, its hydraulic resistance will decrease and the flow rate through the throttle $4a$ into the chambers $3a$ and $5b$ will increase which will cause a rise in the pressure in the chamber $5b$. The height $h_4$ of the throttle $4b$ will decrease, its hydraulic resistance will rise and the flow rate through it into the chamber $5a$ will decrease, which will cause a drop in the pressure in the chamber $5a$.

Such a redistribution in the hydraulic resistances of the slit throttles 4 of the chambers 3 will cause a further rise in the difference of pressures in the bearing chambers 5, which, in its turn, will increase the force opposing the load G.

Unlike the known hydrostatic bearings of similar type, in the embodiment of the bearing being under consideration, the receiving chambers 3 and their slit throttles 4 as well as the separating throttle slits 10 are arranged inside the male part 2 in between the surfaces of said male part 2 and the insert 16 devoid of relative progressive and rotary motions, such types of motions being present in between the surfaces of the male part 2 and the bearing casing 1.

In the case of the embodiment of the hydrostatic bearing according to the invention, as shown in FIG. 4, the response of the liquid medium pressure in the receiving chambers 3 to the load G applied to the shaft 2 does not decrease the force of the liquid medium pressure in the bearing chambers, that opposes the load G, the result of which the supporting power of such hydrostatic bearing (the sizes of said bearing chambers being equal) is higher than that in the known bearings of a similar type.

In view of the fact that in the bearing shown in FIg. 4, the separating throttle slits 10 between the receiving chambers 3 and bearing 5 chambers are formed by the portions $e_2$ of the surface E of the bore 17 of the shaft 2 and by the portions $f_2$ of the surface F of the insert 16 and are arranged inside the shaft 2 between the surfaces F and E devoid of relative progressive or rotary motion, their length can be increased considerably. Once their length is increased, the hydraulic resistance to the overflow of oil between the adjoining bearing 5 and receiving 3 chambers tends to grow appreciably, the pressure difference between the loaded and unloaded bearing chambers 5 will not decrease due to overflow through the separating throttle slits 10 and, consequently, the supporting power of the proposed bearing will be higher than that in the known bearings of the same type. The arrangement of the receiving chambers 3, their slit throttles 4 and the separating throttle slits 10 inside the bearing reduces considerably the overall axial sizes of said bearing, as compared with the known bearings of a similar type.

As the receiving chambers 3 with their slit throttles 4 and the separating throttle slits 10 are arranged between the surfaces of the bearing parts devoid of relative progressive (rotary) motion, the area of oil friction against the moving surfaces will be reduced considerably, as a result of which the heat liberation of such bearing and, consequently, the extent of idle run of such bearing will be much smaller than those in the known bearings of a similar type.

Thus, the hydrostatic bearing under consideration features a greater supporting power, reduced heat liberation and reduces axial sizes, as compared with the known hydrostatic bearings of the same type and of the same radial sizes as those of the proposed bearing.

The considered embodiment of the hydrostatic bearing is the best one when used in units of machine parts that cannot stand great heat liberation causing a temperature shift in the bearing parts relative to the other base surfaces of the units. The proposed variant of a hydrostatic bearing can be especially effective if embodied in coaxial spindle units in diamond-boring machines where tolerable non-coaxiality of these spindle units is very small (some 0.001–0.002 mm).

Figure 7:
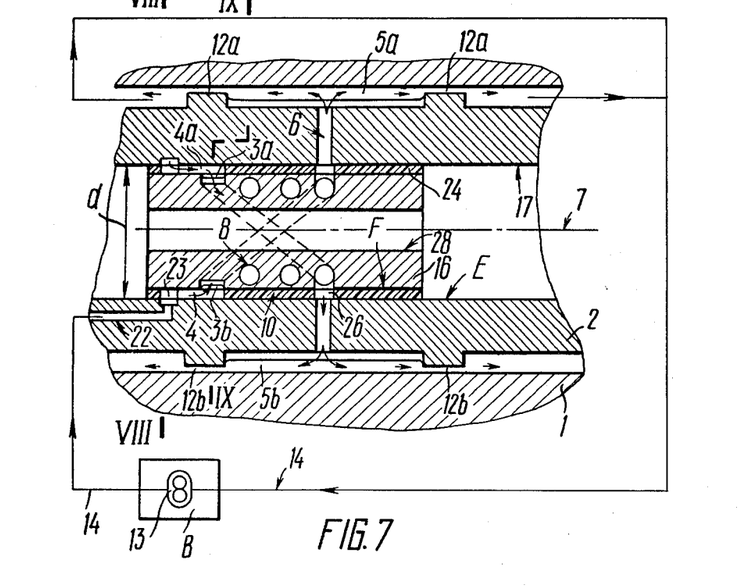
FIG. 7 shows schematically another exemplary embodiment of a hydrostatic bearing, according to the invention (longitudinal section)
Figure 8:
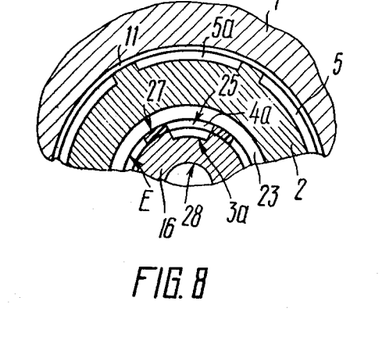
FIG. 8 is a partial cross-section VIII—VIII as in FIG. 7.
Figure 9:
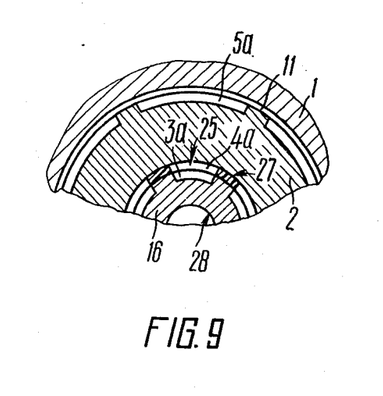
FIG. 9 is a partial cross-section IX—IX as in FIG. 7.
Figure 10:
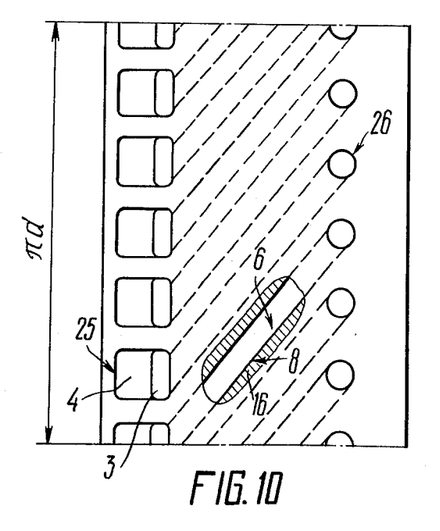
FIG. 10 shows a development of the surface of a band 24 along diameter d (FIG. 7) shown with a partial cutaway view.

FIG. 7 shows a hydrostatic bearing of the invention, wherein a band 24 is arranged in a gap between the male part 2 of the bearing and the insert 16 with the screw-type portions 8 of all the channels 6 said band 24 being made of a rubber-like material, and having ports 25 (FIGS. 8, 9 and 10) matching the receiving chambers 3 and their slit throttles 4, as well as ports 26 (FIGS. 7 and 10) in places where the channels 6 matching their screw-type portions 8 of the insert 16.

The bearing shown in FIG. 7 functions similar to that considered hereinabove and made according to the invention as shown in FIG. 4.

During the movement of the insert 16 (FIG. 7), the walls of the band 24 made of a rubber-like material become squeezed under the action of a force conditioned by the pressure differences in the receiving chambers 3. Since the separating throttle slits 10 of the bearing that separate the receiving chambers 3 from the adjoining bearing chambers 5, and the tangential throttle slits 27 (FIGS. 8 and 9) between the receiving chambers 3 and their slit throttles 4 are filled with the rubber-like material of the band 24, there is no room for oil flowover through the slits 10 or 27, which helps to increase the supporting power of the hydrostatic bearing of the invention, as compared with the known similar hydrostatic bearings. Furthermore, the absence of an oil overflow through the slits 10 or 27 reduces the heating of the oil (occurring due to its flow-over in the known hydrostatic bearings). Said rubber-like or elastic material of the band 24, being compressed (or loosened) during said movement of the insert 16 relative to the male part 2 under the action of a load applied to said part 2, cushions this movement and thus helps increase the damping power of the bearing.

The hydrostatic bearing embodied to the invention can be most effective in spindle units of metal-cutting machines operating under variable loads, specifically, for processing corrugated surfaces of workpieces when the cutting is intermittent and the cutting depth is great (some 0.5 – 1 mm in steel)

In the case of relative motion of the surfaces of the male and female parts of the bearing, when the frequency of the application of the outer exciting forces coincides with the natural frequency of movement of the male part, a stepped-up vibrations of the moving parts of the bearing are developed.

In order to reduce these vibrations various devices have been used, e.g., dampers, which made the bearing sizes larger.

In the hydrostatic bearing of the invention, the insert 16 with the screw-type portions 8 in all the channels 6 can be made of a material whose specific weight is far greater than that of the material of the male part 2, while its weight is selected to be such that this insert could damp vibrations developing during the motion of the male part 2.

Owing to such embodiment, the insert 16 with the screw-type portions 8 of the channels 6 is at the same time a damper of vibrations of the bearing, which considerably increases its vibration resistance. Such bearings, embodied according to the invention, are most effective for use, specifically, in spindle units of diamond-boring machines when a high finish accuracy is required.

In the proposed hydrostatic bearing, the insert 16 with the screw-type portions 8 in all the channels 6 can be made as a bush with an inner bore 28 (FIGS. 7, 8 and 9) and coaxial to the central bore 17 (FIG. 7) of the male part 2. As a result, the part 2 has a through channel, which permits its use for the passage of the rods of various devices, as is the case, for instance, in the spindle units of boring machines when it is necessary to let the rod of a device for securing a workpiece on the spindle through the hydrostatic bearings of the latter; this largely simplifies the design of these units.

If it is necessary to make the male part 2 thin-walled, which is the case with bearings of limited radial sizes, deformation of the part 2 is not excluded during the assemblywork when pressing the insert 9 (FIG. 1) into said male part 2, the result of which the initial finish accuracy of its surfaces deteriorates and, consequently, so does the output accuracy of the bearing functioning.

In this case, the insert 9 (FIG. 1) can be made of a material having an elastic modulus far smaller than that of the material of the male part 2.

Owing to such embodiment, the insert 9 itself is subject to deformation during the assembly work when pressing the insert 9 into the male part 2. Considering that said insert 9 lacks conditioning surfaces in the initial accuracy of the bearing functioning, its deformation will not affect the output accuracy.

Such an embodiment of the hydrostatic bearing is practical, specifically, in spindle units having thin-walled (some 5 mm thick) male parts, e.g. in multi-spindle heads having limited spacing (50–100 mm) between spindle axes.

Figure 11:
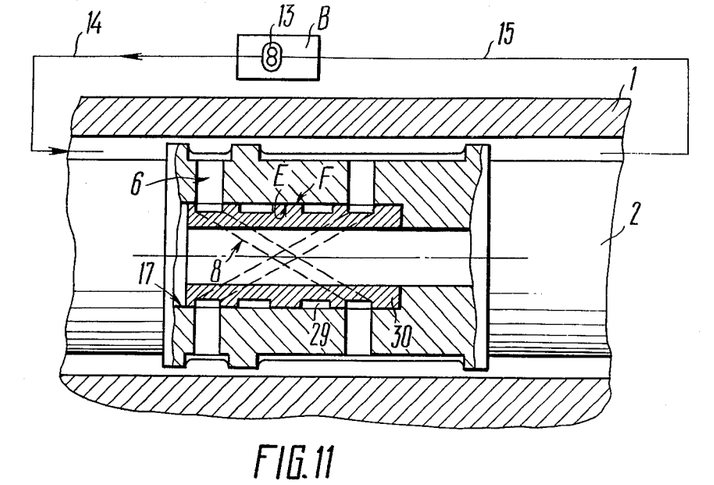
FIG. 11 shows schematically one more exemplary embodiment of a hydrostatic bearing, according to the invention (longitudinal section).

The hydrostatic bearing shown in FIG. 11 and embodied according to the invention has screw-type portions 8 in the channels 6, formed by grooves 29 screwed throughout the outer surface F of an insert 30 and by the surface E of the bore 17 of the male part 2, that faces them. With such embodiment of the screw-type or helical portions 8 of the channels 6, the surfaces forming these portions can be worked on multipurpose metal-cutting machines at a good surface finish, which simplifies the operational process of producing hydrostatic bearings made according to the invention, their temperature characteristics remaining intact.

It is expedient that hydrostatic bearings of the invention should be employed in single-unit (small-series) production of various units, e.g., for unique metal-cutting machines.

What is claimed is:

1. A fluid-bearing comprising in combination first and second machine parts, the second machine part projecting axially through said first part for relative rotation therein; and cooperating means on said parts forming a fluid-bearing between the parts when pressurized fluid is circulated therebetween, said means comprising:

a plurality of bearing chambers about said second part, a plurality of fluid inlet recesses about said second part, each defining with a respective bearing chamber, cooperating pairs of recesses and chambers disposed in diametrically opposed relation to the longitudinal axis of the second part, the second part including an axial bore, an insert element in said axial bore and including circumferential channel portions in the outer surface thereof, helically disposed about the insert element, and forming with the bore pressure fluid conducting passages connecting the respective pairs of recesses and chambers whereby an increased supporting capacity for the fluid bearing is provided.

2. The fluid-bearing as claimed in claim 1 in which said second part and insert include means for permitting rotation of the insert about the longitudinal axis of the second part, said fluid inlet recesses being disposed between outer surface portions of the insert and bore of the second part.

3. The fluid-bearing as claimed in claim 2 including elastic portions interposed between said insert and said bore, said elastic portions flanking the fluid inlet recesses and channels.

4. The fluid-bearing as claimed in claim 1 in which said insert comprises a material having a specific gravity greater than the second machine part, the mass of the insert being such that it comprises a vibration dampener during rotation of the second machine part.

5. The fluid-bearing as claimed in claim 1 in which said insert comprises a bushing disposed coaxially in the bore of the second machine part.

6. The fluid-bearing as claimed in claim 1 in which said insert comprises a material having an elastic modulus substantially less than that of the second machine part.

7. The fluid-bearing as claimed in claim 1 in which said second male part includes a counter bore, said insert comprising a bushing having an inner bore coaxial with the bore of said second machine part.

* * * * *